Nov. 8, 1960   R. F. NEWBERG ET AL   2,958,905
METHOD OF FABRICATING EXPANDABLE
THERMOPLASTIC RESINOUS MATERIAL
Filed Feb. 5, 1959
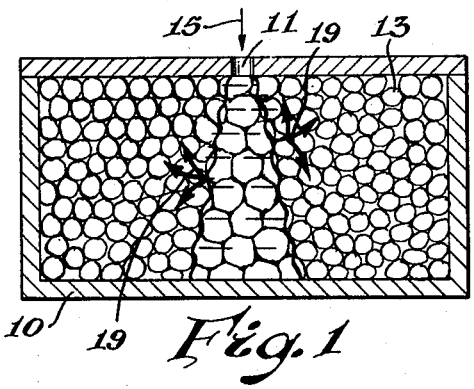
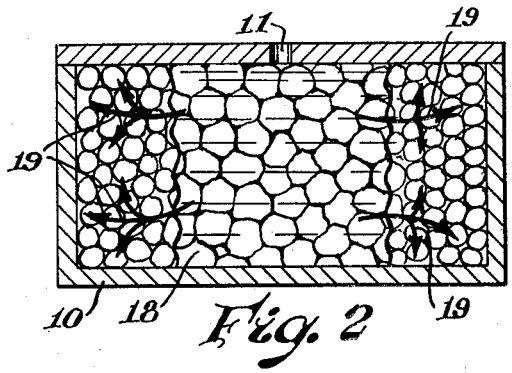
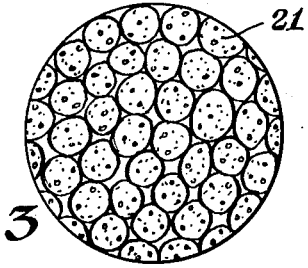
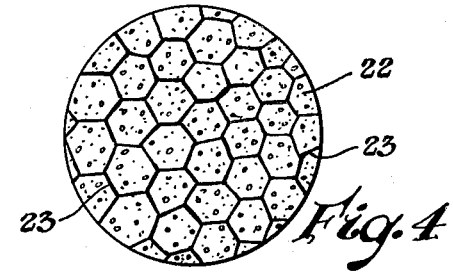
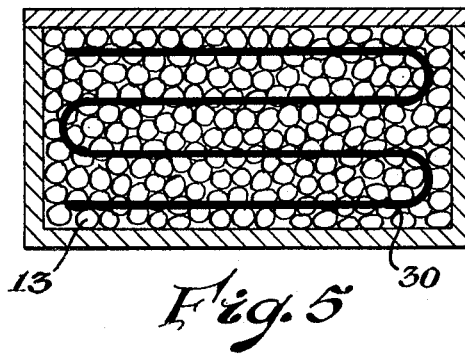
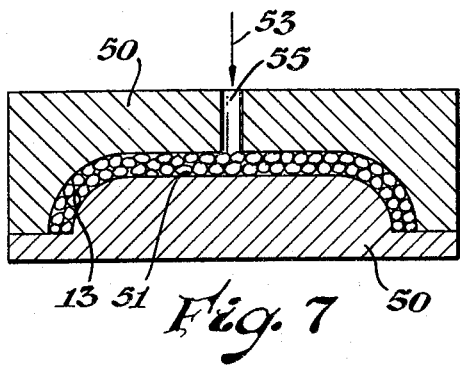
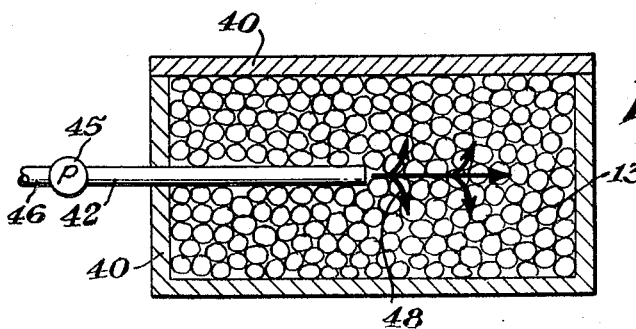
INVENTORS.
Robert F. Newberg
BY Ritchey O. Newman, Jr.
Jerome Rudy
ATTORNEY United States Patent Office 2,958,905
Patented Nov. 8, 1960

1

2,958,905
METHOD OF FABRICATING EXPANDABLE
THERMOPLASTIC RESINOUS MATERIAL

Robert F. Newberg and Ritchey O. Newman, Jr., Midland, Mich., assignors to The Dow Chemical Company, Midland, Mich., a corporation of Delaware Filed Feb. 5, 1959, Ser. No. 791,301
14 Claims. (Cl. 18—48)

The present invention resides in the general field of plastic fabrication and, in particular, contributes to the art of forming expandable thermoplastic resinous materials into various desired molded shapes and structures. More particularly, it relates to a new and improved method of molding expandable (including already partly expanded or pre-foamed) thermoplastic resinous materials.

Pursuant to known procedures, a variety of thermoplastic polymeric and resinous materials may be expanded from a granular or bead form to assume a porous, cellular, solidified foam-like structure by the action of various propellants or agents for expanding or blowing the materials. The blowing agents, in accordance with common practice, are usually gases (or gas generating substances) or highly fugacious liquids which have been dissolved or otherwise intimately incorporated within the thermoplastic resinous material while it is in an unexpanded granular form. The application of heat to an unfoamed granular thermoplastic resinous material containing a blowing agent causes the blowing agent to be released or thermally expanded, or both, while the thermoplastic material is attaining a foaming temperature at which it is sufficiently softened and yieldable to permit the pressure of the thermally expanding blowing agent to expand it into the desired foam structure.

The heat energy which is required to soften the resinous material and release the blowing agent for the foam forming function is conventionally derived from an externally generated source. Thus, steam, hot air and other heat supplying means are ordinarily employed for the purpose of foaming the thermoplastic material.

Due to the usually low heat conducting properties of resinous materials and their greatly increased thermal insulating characteristics during their transformance into and assumption of a cellular foam structure, the foaming of resinous materials by the application of heat energy which is derived from externally generated sources introduces many operational difficulties and is frequently responsible for various dissatisfying results. In many instances the resulting foam structure may be insufficiently expanded or formed with an excessive non-uniformity, or both, and may be produced with other undesirable features and marks of poor quality. This is often the case even when the heat supplying means are passed internally within the material being foamed, as when steam probes and the like are utilized in foam molding apparatus.

In addition, the usual foam producing and foam molding apparatus is relatively complex, inconvenient to handle and expensive to construct and operate, often because of certain included features which are designed to facilitate the heating of the thermoplastic resinous material being expanded.

There has recently been developed several improved techniques for preparing expanded foam and foam articles from various expandable thermoplastic resinous materials. One of these, having significant inherent advantage and benefit, involves first thoroughly mixing an unfoamed or further expandable mass of thermoplastic resinous material in granular or other particulate form with a self-reacting exothermus substance which is inert to the expandable thermoplastic resinous material; then charging the unexpanded or partly expanded foamable mass to a desired mold form wherein or while the exothermus substance undergoes spontaneous self-reaction to generate sufficient heat within the mass to soften it and cause expansion of the blowing agent in the discrete particles in the mass to expand the mass to the desired foam structure.

As heretofore practiced, such a procedure requires complete intermixing of the self-reacting exothermus substance and the particulate expandable thermoplastic resinous material to be expanded with such exothermus substance prior to permitting of the desired foaming action to occur, as in a suitable mold form. When liquid exothermus substances are employed, as is frequently the case, it is generally desirable to wet the particulate or granular expandable thermoplastic material with the unreacted exothermus substance before charging the foamable mass to a mold form. This, as is apparent, ordinarily involves complex and sometimes difficult mixing, pumping and charging procedures. As a consequence, it may require use of specialized blending and handling equipment for preparing the intimate and thorough mixture of the expandable granules with the self-reacting exothermus substance.

In addition, the referred-to procedure wherein the initially intermixed exothermus substance is utilized to effect all or substantially all of the expansion of the expandable thermoplastic resinous material requires the foaming plastic material itself to flow or progress through the mold form or other shaping cavity during its expansion. This considerable movement may sometimes incur difficulties in the preparation of uniform foam articles, particularly when complex or irregular shapes are involved, due to the inability of the expanding mass to entirely and uniformly accommodate itself to the desired configuration in which it is being molded.

It would be advantageous to provide a new and improved technique for fabricating expandable particulate masses of thermoplastic resinous material using self-reacting exothermus substances for the purpose whereby difficulties in mixing and handling heterogeneous systems might be avoided while obviating material or substantial possibilities of irregularity and imperfection in the molded foam product.

Therefore, it is among the principal objects of the present invention to provide an improved method for fabricating expandable thermoplastic resinous materials.

It is a related object to provide a method which does not depend on the use of heat energy derived from externally generated sources in order to accomplish the desired fabrication of the foam.

A further object is to provide a facile method uninhibited by limitations of difficult to handle heterogeneous mixtures whereby foamed articles having improved characteristics can readily be obtained.

A still further object is to provide a simplified and more efficient technique for fabrication of self-expanding masses comprised of expandable thermoplastic resinous materials and self-reacting exothermus substances which advantageously can be employed in the preparation of uniform foam structures, even where highly complex and irregular shapes are being made.

Another object is to provide superior and more uniform foamed articles of thermoplastic resinous materials which have been prepared from self-expanding masses and by the method of the present invention.

Still another object of the invention is to provide an improved and more easily controlled manner for preparing expanded or foamed thermoplastic resinous articles having desired density characteristics.

Yet another object is to provide a better way for preparing molded articles having a sandwich construction comprised of a foamed interior which is enveloped in or at least partially covered by a tough layer or skin of cloth, woven or non-woven fabric, mat, metal, plastic or other material.

It is an additional object of the present invention to provide a better way for preparing molded articles having a composite sandwich contruction wherein the foam molded thermoplastic resinous material is retained in and structurally supports either the foam confining mold form, or is enveloped in or covered by and laminated with or joined to surface skins of fabric, metal or the like against which the expandable composition is formed in the desired structure.

Other objects of the invention and its many cognate benefits and advantages will be more apparent in the following description and specification.

According to the present invention, expanded foam articles of thermoplastic resinous material having easily controlled and more uniform density characteristics are prepared by a method which comprises (1) charging or placing a mass of expandable thermoplastic resinous material in granular or particulate form (which advantageously may be an already partly expanded or pre-foamed mass) to fill or substantially fill (or, in some cases, only partly fill) an enclosing and confining mold form or other void or cavity; (2) adding to said charged mass a quantity of a liquid exothermically self-reacting agent, herein referred to as an "exothermus substance," which is inert to the expandable thermoplastic resinous material and which, upon spontaneous self-reaction, generates thermal energy, in an amount adequate to generate sufficient heat within the mass to adequately soften it and raise the temperature of the expandable mass to a foaming temperature without decomposition or thermal degradation thereof to cause expansion of the individual particles in the mass whereby they are expanded and knit together in a coherent foam structure; then (3) permitting said exothermus substance to react within and permeate and be forced through the expandable mass by the progressive expanding and enlarging effect of said expandable thermoplastic resinous particles until said exothermus substance has completely self-reacted so as to knit and fuse together the entire mass in the form of the confining mold.

Advantageously, for certain purposes, the fabricated products of the present method may be molded from structures in which the foam is laminated to or joined against surface layers of fabric and the like which is retained as an integral or efficiently associated and bonded part of the article, particularly when the reacted exothermus substance provides an adhesive effect between the expanded thermoplastic resinous material and the surface layer being laminated or attached thereto, so as to obtain strong sandwich panel constructions of various desired configurations.

It is oftentimes of greatest advantage to utilize partially expanded (i.e., pre-foamed) thermoplastic resinous particles and to completely fill the mold form or other cavity with the charged pre-foamed expandable mass to which the exothermus substance is subsequently added. In this connection, pre-foamed granules or beads of the expandable thermoplastic material having practically any degree of expansion (short of their full ultimate potential therefor) may be employed, provided, as indicated, that they retain some additional capacity for further expansion when subjected to heat at an elevated, foaming temperature.

The liquid exothermus substance added to the charge of the expandable thermoplastic material in the mold form may be placed therein in a single portion of the charge or spread randomly thereabout, without any necessity or requirement at the outset to thoroughly wet or enfilm all of the individual particles or granules of the expandable mass of material being fabricated. As exothermic heat develops in the area where the self-reacting exothermic substance is initially concentrated, the individual beads or particles of expandable material enlarge and displace the exothermus substance from the area of original addition. This then forces the exothermus substance throughout the entire mold cavity and around or about all of the particulate expandable material in the mass being fabricated. Ordinarily, as a matter of fact, most or a substantial portion of the exothermus substance is forced to or against the surfaces of the mold cavity whereat (particularly when the exothermus substance is a resinous material) it may form a tough surface layer or skin integral with and tightly laminated with the foamed fabricated mass.

Practice of the method of the present invention provide several significant advantages for many applications in which self-expanding thermoplastic masses are desired in comparison with the use of systems wherein the unexpanded resin and the exothermus substance therefor are preliminarily mixed prior to being charged to a mold cavity. Thus, the present method allows use of relatively simple and easily available blending and proportioning equipment for handling the liquid exothermus additament and avoids difficulties which, as indicated and as can be appreciated by those skilled in the art, are frequently encountered in the handling of slurries of unexpanded granular resins dispersed in liquid exothermus substances. Practice of the present invention also facilitates the manufacture of expanded foam articles having more uniform density distribution, especially in the core or central interior portion of the molding. It additionally permits better and more even foaming action to occur in the structures being fabricated. One reason for this is that the mold form or other cavity that is filled is (at least in most cases wherein prefoamed beads are employed) initially substantially uniformly charged with the expandable material of a given bulk density. Thus, the article being fabricated is started with a mass having substantially uniform density distribution which more readily possibilitates closer control of the density desired for the final foam product.

In this connection, the present method is particularly adapted to produce foam articles in relatively thin and/or complex shapes which are unusually uniform and strong and eminently satisfactory in character. This is one of the significant results of elimination of the need for the entire or substantial portions of the mass of foaming thermoplastic material to itself physically move substantial distances in the mold form or to force itself into constricted areas of a complicated or thin section mold during the fabrication.

The density obtained in the fabricated foam article depends upon the final density of the expanded thermoplastic material and the quantity of exothermus substance utilized to secure its being foamed and knit together. As is apparent, the final density of the resulting structure is the sum of the weight, in any given molding, of the expanded plastic plus the exothermus substance per unit volume of molding. Desired densities (even in very low density ranges) can be readily effected by appropriate combinations of charged expandable material and exothermus substance for fabrication thereof. Use of low bulk density pre-foamed thermoplastic masses in the charge, taking into account the quantity of exothermus substance desired or necessary for its fabrication, generally results in correspondingly low density products.

Any thermoplastic resinous material which can be expanded or foamed as a result of or by application of heat thereto may advantageously be fabricated according to the method of the present invention. Merely for purposes of convenient illustration, however, without intending to be restricted thereto, the invention will be predominantly described in connection with expandable granules or particles of styrene polymers, such as polystyrene. These may be in an essentially linear or in a cross-linked form. Such resins are generally realistically representative of expandable thermoplastic resinous materials. They are especially representative of thermoplastic resinous alkenyl aromatic compounds which contain at least about 50 weight percent of at least one alkenyl aromatic compound having the general formula:

$$Ar\text{---}CR\text{=}CH_2$$

wherein Ar is an aromatic radical (advantageously one containing from 6 to about 14 carbon atoms, including the carbon atoms in various substitutents, such as alkyl groups on the aromatic nucleus) and R is selected from the group consisting of hydrogen and methyl, any balance being another ethylenically unsaturated monomeric material polymerizable with said alkenyl aromatic compound to provide thermoplastic resinous products (such as acrylonitrile, methyl methacrylate, etc.).

Expandable thermoplastic moldable polymers and copolymers (including graft copolymer products) of ar-methyl styrene or vinyl toluene, the several chloro styrenes (such as mono- and dichloro styrene), ar-dimethyl styrene, ar-ethyl styrene and the like, including the various thermoplastic moldable polymers and copolymers of alpha-methyl styrene, may frequently be utilized with benefits commensurate to those which are derivable from employment of polystyrene. Often, this may also be the case when other expandable thermoplastic resinous materials well known to the art are employed, including those which may be comprised of polymers and copolymers of methyl methacrylate, such as its homopolymer and the copolymers thereof with vinylidene chloride; thermoplastic polymers and copolymers of vinyl chloride, including homopolymeric vinyl chloride, various thermoplastic, expandable natural and synthetic rubber compositions; thermoplastic expandable ester and ether derivatives of cellulose including cellulose acetate, cellulose propionate, cellulose acetate butyrate, ethyl cellulose and the like, cellulose nitrate and so forth; expandable thermoplastic olefin polymers and copolymers, particularly those from non-aromatic hydrocarbon olefins, such as polyethylene, polypropylene, copolymers of ethylene and propylene and the like; chlorinated polyolefins such as chlorinated polyethylene, etc., and the like.

The blowing agents employed for the expandable thermoplastic resinous material may be any of those which are commercially utilized for such purposes, including such fugacious materials as dichlorodifluoromethane, monochlorotrifluoromethane, carbon dioxide, pentane and other low boiling hydrocarbons and other suitable materials such as heat-sensitive gas generating agents (liquid or solid) including those which, upon thermal decomposition, generate nitrogen, carbon dioxide, etc.) and the like. As is apparent, the expandable resinous materials are prepared with conventional quantities of the particular blowing agent involved, depending upon the amount of the specific propellant substance that may be necessary for a given thermoplastic to accomplish efficient foaming action upon application of heat to the expandable mass. Thus, between about 1 and 15 weight percent or so of such fugacious materials as dichlorodifluoromethane, carbon dioxide or pentane may be employed. The fugaceous or gaseous blowing agents may be incorporated into the thermoplastic material by any technique suitable for the purpose; including such known procedures as pressing a volatile or gaseous blowing agent under appropriate conditions of temperature and pressure into an already prepared thermoplastic material desired to be rendered expandable or, alternatively, by including certain of such agents in the polymerization mass in which the thermoplastic polymer is prepared so as to thereby incorporate efficient amounts of the blowing agent in the polymer and directly provide an expandable product. Similar or even greater amounts (as, for example, up to 25-30 or so percent) of such solid blowing agents as $\alpha,\alpha'$-azobisizobutyryl nitrate or p,p'-oxy-bis benzene sulfonyl hydrazide (which generate nitrogen) and sodium carbonate (which generates carbon dioxide) are generally employed. Solid blowing agents are usually incorporated in a thermoplastic material by milling or efficient intermixing and blending procedures in order to obtain the desired expandable product.

When pre-foamed or partially expanded materials are employed in the practice of the present invention, it is necessary for the expandable mass to contain an efficient residue of the blowing agent (or the gas generated therefrom) trapped within its cell walls (oftentimes in combination with infused air) to permit further expansion of the material upon application of heat.

The expandable particles to be fabricated can, as indicated, have any desired initial density for use in practice of the present invention. Thus, totally unexpanded materials can be employed having densities (or bulk densities) approximately the same as the stock polymer or resin from which they are derived. Advantageously, however, pre-foamed or partially expanded beads or particles are utilized, especially those that have been preliminarily expanded at least about 50 percent of their ultimate potential capacity. The present invention may thus be advantageously practiced to fabricate pre-foamed particulate materials having bulk densities as high as 20-30 pounds per cubic foot to as little as about 0.5 pounds per cubic foot. Such low density pre-expanded materials are frequently obtained having sufficient remaining potental for further expansion to permit easy and entirely satisfactory fabrication into desired shaped articles by the present technique. For most practical requirements, however, it is generally desirable for the bulk density of a pre-foamed particulate material that is utilized to be not much less than about 1 pound per cubic foot and not much greater than 10-15 pounds per cubic foot.

In this connection, when unfoamed or only relatively slightly pre-foamed thermoplastic materials are employed, it is generally better to charge the mold cavity only partly full to better accommodate the considerable tendency of the foamable material to expand during fabrication. Under such circumstances, the charge of unfoamed or relatively slightly pre-foamed material may occupy as little as 1 percent, or perhaps 5-10 percent, of the volume of the mold. Of course, if very dense foamed structures are desired as products, as is sometimes the case for certain articles of manufacture, the initial charge to the mold cavity of unfoamed or slight to moderately pre-foamed particles may entirely fill the mold or be measured to occupy any desired volumetric proportion thereof. However, with the ordinarily prepared pre-foamed materials (particularly those pre-expanded at least 50 percent of their ultimate potential and especially those with bulk densities between about 10 and 0.5 pounds per cubic foot), it is generally most advantageous to completely fill the mold form on the initial charge of expandable thermoplastic material thereto, or to at least substantially fill it to say about 90 percent or so of its total volume.

If desired, certain proportions of non-expandable filler materials can be mixed with and incorporated in the expandable mass that is charged to the mold. Such a procedure generally results in foam structures having relatively greater densities, but which are obtained with excellent strength and, frequently, with material reduction in or minimization of the cost of the product. The non-expandable filler employed can either be compatible or non-compatible with the foam that is produced from the expandable thermoplastic material utilized in the practice of the present invention. The compatibility of the filler is relatively immaterial since, when incorporated in the product, it forms an attractive and desirable matrix structure. Up to about 50 weight percent (and frequently more) of filler, based on the total weight of the charge of expandable and filler material to the mold, can thus be employed for preparation of the present articles.

Suitable fillers for such purpose include plain non-expandable molding granules or other finely divided particles of the same or a different thermoplastic resinous material as is in the expandable material being fabricated; saw dust; wood chips and the like; wood flour; staple or other short lengths of various natural and synthetic fibers including, for example, glass fibers, cotton, nylon, etc.; clay; carbon black; titanium dioxide and other pigments which, incidentally, may be employed to secure some desired coloration in the product, as is the case with various dyestuffs that may also be employed accordingly.

When non-expandable fillers are employed in the composition to be fabricated, it may frequently be necessary to adjust the quantity of the exothermus substance that is utilized to compensate for the nonexpandable material present. Ordinarily, it is found that relatively more of the exothermus substance is required to fabricate compositions containing desired proportions of non-expandable filler included therein, generally in proportion to the quantity of such filler that is utilized.

When relatively large structures or complex foamed configurations are being prepared in the practice of the present invention, it is generally more advantageous to use pre-foamed expandable thermoplastic resins in order to more easily secure and ensure more uniform density distribution in the resulting product. Of course, there is significant advantage to using pre-foamed material in many relatively small desired structures. As the desired density increases, the necessity for utilizing more extensively pre-expanded particles or beads tends to lessen, unless, as mentioned above, non-expandable filler materials are desired to be employed. As has been explained in the foregoing, when relatively dense articles are desired, totally unexpanded or only relatively slightly pre-expanded materials may be charged to fill the mold completely full or to relatively larger proportions of its volume in order to be fabricated therein with the liquid exothermus substance subsequently added thereto in any instance where it may not be desirable to increase density by use of non-expandable filler materials.

The liquid exothermus substance employed, which, as has been indicated, is an exothermically self-reacting agent, may be any liquid substance or liquid mixture of substances which liberates substantial quantities of heat upon intra- or self-reaction. The heat may be generated as a result of a true chemical reaction or it may be caused by a physical or quasi-chemical type of interaction such as occurs when many substances are being dissolved. As indicated, the exothermus substance should be inert to the thermoplastic resinous material which is being formed. In other words, it should not enter into a chemical reaction with the resinous material so as to cause its decomposition or to otherwise alter its essential characteristics. Neither should it be physically reactive with the thermoplastic resinous material as by dissolving it or causing it to be excessively swollen. A slight softening or plastifying influence, however, may under certain circumstances, have a benign effect to increase the volume of expanded material which may be attained by a given mass of thermoplastic resinous material.

It is particularly beneficial for the exothermus substance to be one which generates or reacts to a product having an adhesive effect upon the expanded thermoplastic resinous material, especially when molded articles or sandwich type constructions retaining a surface laminated layer are being prepared. This serves to reinforce the entire foam structure and produces an article of unusual sturdiness and high strength. Exothermus substances which self-react to adhesive products provide an unusually tough skin on the surface of the expandable thermoplastic resinous material being fabricated. Exothermus substances of this nature are particularly beneficial when a composite sandwich construction is being made. In such cases, the adhesive product of the exothermus substance bonds and tightly laminates the molded foam to the associated surface skin or layer.

Of course, it is not necessary for a resin-producing exothermus substance to be one that reacts to an adhesive product in order to provide satisfactory surface layers of the reacted exothermus substance on the fabricated article. Many resin-producing exothermus substances which do not form adhesive products are capable of providing tough and durable surface layers or skins about the foamed interior portions of the fabricated articles.

In this connection, as will readily occur to those skilled in the art, practice of the present invention affords a most advantageous means of providing laminated or surface skin-protected (or clad) articles, even when products having complex and irregular geometric configurations are being fabricated. Thus, when a resin-providing exothermus substance is utilized and relied upon solely to produce a surface layer, such covering, as is apparent, is readily provided about the fabricated article regardless of the intricacies or irregularities of the pattern in which it is molded.

Likewise, similar results are obtained when cloth or fabric covers are laminated to or bonded with the foam article. This is accomplished by merely lining the mold cavity with the desired surface covering prior to charging the expandable material thereto. The expanding action during the fabrication pushes the cover tightly against the confining walls of the cavity in which the article is being fabricated to thus facilitate preparation of products in complex shapes with uniformly and neatly applied integral surface skins.

In this connection, the surface skin may be provided as a true laminate over the foamed interior of the structure or as an integral bonded part thereof by appropriate use of proper quantities of the exothermus substance (especially when it reacts to an adhesive product) that is utilized. Thus, if only enough of the exothermus substance is applied to merely exude to the surface of the expanded material, the surface skin desired, be it either a permeable fabric or an impervious metal or other layer (such as plastic film or a plastic film-forming composition), is generally merely laminated with the foam structure. On the other hand, when using relatively permeable surface skins (such as cloth, fabric, non-woven mats or webs, etc.), the employment of sufficient quantities of exothermus substance to achieve an independent and distinct surface layer thereof, regardless of whether or not it is adhesive in nature, generally envelopes and enfilms the joined permeable layer so that it becomes an integral part of the fabricated article in combination with the surface layer of the reacting exothermus substance that is formed thereon.

The quantity of the exothermus substance which is employed depends upon its exothermic heat of self-reaction and the quantity of heat which is required by a given mass of unfoamed thermoplastic resinous material in order to bring it to an optimum temperature to be foamed by the thermally expanding blowing agent in the discrete particles in the mass. It also depends somewhat on the final foam density which is desired, since the use of relatively greater quantities of exothermus substance generally produces greater weight per given volumes of expanded resinous material. A sufficient quantity of the exothermus substance should be employed to raise the temperature of the expandable mass of thermoplastic resinous material to a foaming temperature. Most expandable polystyrene and like materials, for example, require a temperature of at least about 185–190° F. for this purpose. Conversely, the employment of excessive amounts of the exothermus substance should be avoided to preclude overheating and thermally degrading or decomposing the expanded thermoplastic resinous material. Certain types of foamable polystyrene and similar beads may be caused to collapse after they have been expanded when they are subjected to a temperature in the range from 275° F. to 400° F. and may decompose at higher temperatures.

In many instances, particularly where a "hot" or exceptionally self-reactive exothermus substance is employed, or relatively large masses of thermoplastic resinous material are being foamed, it may be expedient to employ a coolant or heat absorbing agent in association therewith, such as a liquid which is vaporizable at a beneficial temperature within the operating temperatures involved. This prevents local overheating which might result from an excessive heat of reaction generated by an exothermus substance and which otherwise might not be adequately diffused through the insulating expanding foam structure. Such a practice may be utilized with advantage to avoid the undesirable consequences of local overheating.

The exothermus substance may advantageously be a monomeric material or an already partially polymerized material which is capable of undergoing an exothermic polymerization with or without the assistance of initiators, polymerization catalysts or curing agents. It should be a liquid or at least a flowable slurry or other mixed composition of solid and fluid. Liquids allow a more intimate mixture and permeation through the mass of the exothermus substance to be achieved with the unfoamed thermoplastic resinous material. A more thorough and intimate progressive permeation and mixing provides for a more efficient and uniform internal heating effect.

The precursors of epoxide (or epoxy) resins or uncured or low molecular weight epoxide resins, including those resins produced by reacting in one or more stages polyhydric phenols, such as bisphenols, or polyhydric alcohols with epihalohydrins, polyhalohydrins or polyepoxides are particularly advantageous for purposes of providing heat by self-reaction for expanding polystyrene granules and like expandable resins of thermoplastic alkenyl aromatic compounds and other expandable thermoplastic resinous materials in accordance with the present invention. Epoxy resins in general are curable with considerable liberation of heat when such curing agents are substituted formaldehydes, polyhydric phenols, polybasic acids, polyamines and polyamides containing available active hydrogens are employed. They are usually available in a liquid form and provide excellent adhesive materials upon curing. A dihydric phenol-epichlorohydrin material, such as a bisphenol A-epichlorohydrin resin, which is readily curable with polyamines may be employed with especial benefit as an exothermus substance to provide an internal, self-reacting heat source for expanding polystyrene and similar or equivalent expandable thermoplastic resinous materials. "Bisphenol A" is a common designation for 4,4'-dihydroxy diphenyl dimethyl methane. Such a resin may conveniently be cured upon addition of between about 6 and 40 parts by weight, per hundred parts by weight (equivalent weights, based on the epoxide equivalent value) of the self-reacting bisphenol A-epichlorohydrin resin, of a polyamine such as triethylene tetramine or diethylene triamine or mixtures of the two, although it is often simpler and more desirable to employ only a single curing agent. As will be appreciated by those skilled in the art, the actual amount of curing agent that is employed may vary depending on the particular equivalent weight of the polyamine that is involved. The optimum amount of such exothermus substances for any particular application may vary not only with the particular resin and curing agent which is employed but with the quantity of the mass being expanded and the heat retaining or insulating characteristics of the configuration into which it is being molded.

Epichlorohydrin-resorcinol condensation resins, epoxylated novolak resins and other self-condensing phenolic resins as well as liquid polyurethane-producing mixtures are examples of other curable self-reacting materials which may advantageously be employed as exothermus substances in the practice of the invention.

Other liquid exothermus substances which may be utilized in the practice of the invention include aqueous solutions of quicklime (CaO) and the like metal oxides; exothermic mixtures of magnesium chloride and the like salts with water; aqueous solutions of caustic soda; and aqueous solutions of mineral acids which heat substantially upon mixture; and so forth. When aqueous exothermus substances are utilized, it may be advantageous to incorporate therein such materials as sodium orthosilicate and the like which not only contribute to the desired exothermic reaction when in contact with water, but also function as a binder for the expanded thermoplastic resinous material being knit together.

The method of the present invention is adapted to be practiced with varying quantities of the exothermus substance per unit weight or volume of the expandable material being fabricated. Although the requirements may vary under differing conditions of fabrication, each part by weight of such expandable granules or particles as polystyrene may generally be fabricated satisfactorily when using between about 0.5 and 10 parts by weight of an epoxide resin, such as a bisphenol-A epichlorohydrin resin, when it has been mixed with suitable quantities of a curing agent. Frequently, when such epoxy resins are utilized as the liquid exothermus substance, a resin-to-bead (i.e. expandable thermoplastic) weight ratio that is even more advantageous to employ is between about 1 and about 4 parts by weight of the exothermus substance for each part by weight of the expandable material being fabricated.

As mentioned, however, the most desirable amount of exothermus substance to be employed will vary with the quantity of the mass being fabricated and the shape or form in which it is being molded. As a rule, relatively greater volume or bulk masses of the expandable thermoplastic resinous material and larger configurations of such masses which have high volume to low surface area ratios require less of the exothermus substance to generate adequate quantities of heat for the fabrication. The converse, likewise, is generally true. Relatively smaller masses and low volume to high surface area ratios usually require greater amounts of the exothermus substance in order to be fabricated wet due to their smaller insulating and heat-retention capacities.

In this connection, if the fabrication of the expandable material is made against surface layers which are of a porous or adsorbent (or absorbent) nature (such as glass fiber webs and fabrics, sisal webs and fabrics and other reenforcing fabrics which may be in woven or unwoven mat form), it is necessary to employ relatively greater quantities of the exothermus substance in order to compensate for the amounts thereof that are taken up in the material being laminated on or joined with the surface of the molding. Thus, an equivalent molding being fabricated with a glass fabric bonded on its surface may require a resin-to-bead ratio in the neighborhood of 3–4:1, whereas, the same molding, without the laminated surface, might be satisfactorily prepared with a much lower resin-to-bead ratio, as in the neighborhood of 1–2:1, or so.

In many cases, it is advantageous to pre-heat the exothermus substance before charging it to the expandable mass contained in the mold form in order to hasten and facilitate the self-reaction which occurs. Thus, when epoxy resin exothermus materials are being employed containing amine or equivalent curing agents therefor, it is frequently beneficial to pre-heat the exothermus substance to a temperature between about 50 and 100° C. or so. Likewise, if desired, the expandable material can be warmed or preheated to a temperature beneath its foaming temperature prior to or while being charged to the mold.

As indicated, the mold form that is utilized must be capable of confining and restricting the mass being fabricated. While a flexible or yieldable mold form may be employed providing it can achieve adequate restraining effect, it is generally desirable to use rigid and even re-enforced mold forms that are capable of withstanding pressures on the order of 15 to 50 p.s.i.g. and higher. Of course, the use of expandable materials having greater capacity for expansion than the final volume to which they are fabricated increases the necessity for using stronger retaining molds or other confining cavities.

Additional features and advantages of the present invention will be apparent in connection with the accompanying drawing which schematically represents several aspects and features of the practice of the present invention wherein, insofar as possible, like reference numerals refer to like parts, in which:

Figure 1, in partial cross-section schematically illustrates a charged mold to which the exothermus substance is being added;

Figure 2 illustrates the course of the fabricating operation and the progress of the exothermus substance through the expanding thermoplastic material;

Figure 3, on an enlarged scale, depicts a portion of expandable thermoplastic material prior to its fabrication as contained in a charged mass;

Figure 4 illustrates a section of the fabricated product;

Figure 5 is a plan view of an uncovered mold illustrating a pouring pattern for adding the exothermus substance by a varied technique;

Figure 6, in partial cross-section, illustrates another procedure for adding the exothermus substance; and Figure 7, in cross-section, illustrates one type of relatively thin and complex structure which may be advantageously prepared by practice of the present invention.

With initial reference to Figures 1 and 2, there is generally shown, in cross-section, a mold form 10 charged full with a mass of expandable thermoplastic resinous material in particulate or bead form, indicated by the reference numeral 13. The charge of the liquid exothermus substance is admitted, in appropriate quantity, through the charge port 11 at the top of the mold in the manner indicated by the directional arrow 15. Reference numeral 17 indicates the initial distribution through the expandable material, mostly by gravity, of the exothermus substance added to the charged beads 13 in the mold 10.

As the exothermus substance undergoes spontaneous or self-reaction, it expands the beads in immediate contact therewith. As a result, substantially all of the exothermus substance (excepting that remaining in contact with the expanded beads) is forced and literally squeezed into new areas throughout the mass, as demonstrated by the directional arrows 19. These illustrate the progress of the advancing exothermus substance permeating throughout the unexpanded portion of the charge of expandable material. In Figure 2, the area designated by reference numeral 18 indicates an intermediate distribution of the exothermus substance throughout the charged mass in the mold during the fabrication operation, with the front or advancing quantity of the liquid exothermus substance, as indicated by the arrows 19, progressing throughout the mass and heating all of the particles therein during the course of such advance in order to cause their expansion and result in their cohesion and knitting together in the shape of the desired structure. In this manner, the exothermus substance is forced throughout the molding by being literally wrung out and squeezed from between the expanded material and forced to permeate through the unexpanded segments thereof so as to effect the expansion of all of the thermoplastic material in the charge to fill the volume of the mold.

As is apparent, the technique of the present invention greatly simplifies problems involved in fabricating articles from expandable thermoplastic resinous materials. No heterogeneous mixing of granular solids and liquids is involved. The mold or other cavity is charged with the expandable material in any desired manner including manual filling or pneumatic conveyance thereof. If it is necessary, as is oftentimes the case, for the exothermus substance to be mixed or blended, such operation can advantageously be performed with conventional and oftentimes commercially available blending equipment. Likewise, as hereafter illustrated, ordinary liquid handling and metering apparatus can be utilized to add the liquid exothermus substance to the mass being fabricated.

Figures 3 and 4 illustrate the conditions that permit the present fabricating method to proceed. Thus, as is apparent in Figure 3, a considerable occurrence of void and hollow spaces occurs between the charged expandable beads 21 in the mass to be fabricated, each of which (in the case of pre-expanded material) is a foam structure containing a plurality of internal cells or open spaces. When the liquid exothermus substance is added between such interparticle voids, the heat from its spontaneous self-reaction causes the beads to expand whereby, as illustrated in Figure 4, the expanded and fabricated particles 22 force out a substantial portion (and frequently most) of the exothermus substance excepting for a minor quantity of reacted material 23 which remains, frequently as an interlaced and interlinking network between the expanded particles to assist in holding the expanded, cellular foam particles together.

While, as is illustrated in Figures 1 and 2, the exothermus substance can be added to the charged mold through a single point of entry, after the mold has been closed to confine the charge mass of expandable thermoplastic material, it can also be added as depicted in Figure 5 of the drawing by pouring it in a random pattern (traced by the line identified with reference numeral 30) over the surface of the charged mass of beads 13 and immediately thereafter placing the cover (not shown) on the mold 25 to confine the mass therein during the reaction of the exothermus substance and its progress through the mass whereby the fabricating is accomplished.

Likewise, the exothermus substance can be metered and forced centrally into the charged mass of expandable material. As a matter of fact, it is frequently advantageous to force the exothermus substance into the charged mass under pressure so as to expedite its distribution and heat fabricating effect throughout the charged mass being knit together. This is illustrated in Figure 6 of the drawing, wherein a charged mass of expandable beads 13 are contained in an enclosed mold 40 into which the liquid exothermus substance is metered and discharged in a pattern indicated by the directional arrow 48 from a probe 42 inserted centrally in the mass of beads 13. The liquid exothermus substance is forced through the probe from a conduit 46, communicating with any suitable source of supply (not shown), by means of a suitable metering pump 45. While the probe can be open-ended (as shown), wall-perforated probes having open or closed ends can also be employed. In addition, the probe need not be inserted in the direct center of the mass, but can obviously be placed to discharge in any desired portion thereof. Likewise, more than a single probe may be employed, especially in very large moldings.

In Figure 7, there is depicted a molding operation illustrating fabrication of a relatively thin, complex shaped article. The charged mass of expandable beads 13 is contained in the cavity 51 of the mold 50 and the exothermus substance is added thereto, as indicated by the directional arrow 53, through the single charge port 55 leading to the mold cavity. Due to the action of the exothermus substance in progressing through the expandable mass in the manner illustrated in Figures 1 and 2, such thin and complex shapes can be readily fabricated by practice of the present invention without involving difficulties which may be encountered when employing self-expanding masses that require the expandable plastic material to its flow through the mold form in the course of its expansion. As is apparent in Figure 7, the mold cavity can be readily charged with the expandable material and merely the exothermus substance for fabricating and knitting the plastic particles together need travel through the mold cavity.

Although not portrayed in the drawing and even though it represents a usually less desirable sequence of operations, it is possible in certain instances to fabricate articles in general accordance with the present technique by first adding the liquid exothermus substance to the mold form or cavity, then charging the expandable mass of particulate thermoplastic material therein (advantageously under positive pressure, as with a ram) in order to accomplish the desired operation within the confines of the mold. In such cases, of course, the mold after charging with the beads can actually be quickly inverted to permit the exothermus substance to permeate through the mass from above.

Further illustration of the invention is provided in and by the following docent illustrations wherein, unless otherwise indicated, all parts and percentages are to be taken by weight:

ILLUSTRATION "A"

About 1363 gms. of pre-expanded polystyrene beads, having a bulk density of about 2.8 pounds per cubic foot, were charged to fill an aluminum mold having an enclosed cavity with dimensions of about 4" by 12" by 36". The pre-expanded particles were prepared from unfoamed polystyrene granules having a mean diameter of about 1.4 mil. and containing about 13 percent of dichlorodifluoromethane as a blowing agent by heating them until they partially expanded to assume the desired bulk density. After charging the mold with the pre-expanded granules, there was thoroughly mixed together about 1363 gms. of bisphenol-A epichlorohydrin epoxy resin having an epoxy equivalent weight of about 175; 287 gms. of diethylene triamine; and 143 gms. of a coolant modifier consisting of about 40 percent isopropyl alcohol with 60 percent water. The mixed liquid exothermus substance was then poured into the charged mass in the mold and the mold clamped tight. Foaming and ultimate expansion of the mass occurred without any addition of or assistance from external heat. An excellent foamed article was obtained which had a tough skin layer of the reacted epoxy resin on its surface which had been forced out from between the beads during their fabrication. The product had an interior average density of about 7 pounds per cubic foot of foam.

ILLUSTRATION "B"

Following the general procedure of the first illustration, a series of molded foam products, some of which were prepared with covering surface layers integrally bonded thereto, were fabricated using the same variety of polystyrene (PS) beads as in the first illustration and the same type of liquid epoxy exothermus substance for the fabrication. In the following tabulation, there are set forth data concerning the various types of molds as well as the quantities and types of pre-foamed beads employed; the quantity of exothermus substance utilized; the surface coverings used, if any; and the method of feeding the exothermus substance to the charged mold:

Table I

| Run No. | 1 | 2 | 3 | 4 | 9 | 6 |
| --- | --- | --- | --- | --- | --- | --- |
| Vol. of Hold, cubic feet | 1 | 1 | 0.6 | 0.6 | 0.6 | 1.8. |
| Bead bulk density, lbs./ft.³ of charge | 3.0 | 4.0 | 3.9 | 3.9 | 3.9 | 3.5. |
| Weight exothermus substance, lbs. | 2.7 | 3.6 | 3.55 | 4.94 | 5.85 | 7.9. |
| Weight PS beads, lbs. | 2.7 | 3.4 | 1.5 | 1.5 | 1.0 | 6.3. |
| Resin/Bead Wt. Ratio | 1.0 | 1.2 | 1.8 | 2.5 | 4.5 | 1.25. |
| Surface Reinforcement applied to molding | None | None | Style 1,500 glass fabric | 2 oz. glass mat | 2 oz. glass mat | Style 1,500 glass cloth. |
| Method of Feeding Exothermus Substance | (¹) | (¹) | (²) | (²) | (²) | (³) |

¹ Pressure feed through one hole in mold surface.
² Pressure feed through one hole in bottom of female cavity of mold.
³ Pressure feed through probe inserted through mold side and extending ½ way across cavity. Both open end and perforated probe used in repetition of same procedure.

The procedure of run 6 was also duplicated in an entirely satisfactory manner to form excellent quality fabricated products using, as the expandable thermoplastic material, pre-foamed polystyrene beads having bulk densities in the neighborhood of 1.8 to 2 pounds per cubic foot.

ILLUSTRATION "C"

Excellent commensurate results are obtained when the procedure of the first two illustrations is duplicated with expandable beads, employed in an unfoamed condition or pre-expanded to any desired bulk density, particularly to densities in the above-indicated ranges, from expandable compositions of the type set forth in the following Table II:

Table II

| No. | Symbolic Designation | Chemical Composition | Physical Characteristics of Granules |
| --- | --- | --- | --- |
| 1 | StA | Normally solid copolymer of styrene and acrylonitrile consisting, in the polymer molecule of approximately 70 weight percent of styrene and 30 weight percent of acrylonitrile copolymerized with one another. | Chopped granules with varying shapes (i.e. generally rectangular cubes, prisms, columns, etc.) 99 percent of which passed through 8 mesh screen in U.S. Standard Sieve Series and 51 percent of which passed through 16 mesh screen. |
| 2 | ClSt | Normally solid dichlorostyrene polymer consisting of about 97.5 weight percent of dichlorostyrene and 2.5 weight percent styrene polymerized in the polymer molecule (solution viscosity 10–15 cps.). | Generally spherical granules having mean diameter of 1 to 1.5 mm. |
| 3 | StMA | Copolymer of styrene and methacrylic acid containing in the polymer molecule about 83 weight percent of styrene and 17 weight percent of methacrylic acid. | Chopped granules (as above) all of which passed through 10 mesh screen and all of which stayed on 14 mesh screen. |
| 4 | PVC | Normally solid homopolyvinylchloride | Generally rectangular granules having approximate dimensions of 3.2 x 3.2 x 6.4 mm. |

Table II—Continued

| No. | Symbolic Designation | Chemical Composition | Physical Characteristics of Granules |
|---|---|---|---|
| 5 | ExPS | Normally solid polystyrene cross-linked with about 0.049 weight percent of divinyl benzene. | Generally spherical partially expanded granules having mean particle diameter of 2.3 to 3.2 mm. and bulk density of about 26 lbs./ft.$^3$ obtained from unexpanded beads having average spherical particle size of from 1 to 1.5 mm. and approximate bulk density of 40–42 lbs./ft.$^3$ |
| 6 | XLPS1 | Same composition as No. 5 in totally unexpanded form. | See No. 5. |
| 7 | XLPS2 | Same as No. 5 excepting to contain only about 0.04 weight percent of divinylbenzene as a cross-linking agent. | Generally spherical beads having mean diameter of 1 to 1.5 mm. |
| 8 | PS | Normally solid polystyrene. | Generally spherical beads having mean diameter of 1 to 1.5 mm. |
| 9 | GCP | Normally solid graft copolymerized polymer composition prepared by polymerizing about 95 parts of monomeric styrene in the presence of and with about 5 parts of an ordinary GR–S rubber comprised of a copolymer of styrene and butadiene containing about 25 weight percent of styrene and 75 weight percent of butadiene in the copolymer molecule. | Generally cylindrical granules having diameter of about 1.6 mm. and length of about 1.6 mm. |
| 10 | PMM | Polymethylmethacrylate. | Finely Divided Granules. |
| 11 | PVT | Polyvinyltoluene, uncrosslinked. | Granules of about 0.7 x 0.8 mm. dimension. |
| 12 | PVTX | Polyvinyltoluene, crosslinked. | Same as No. 11. |

ILLUSTRATION "D"

The procedure of Illustration "A" is duplicated excepting to employ in the mixed liquid exothermus substance varied proportions of diethylene triamine (DETA) and triethylene tetramine (TETA) as the curing agent for the epoxy resin, according to any of the proportions set forth in the following Table III, wherein the ratios of each amine constituent given are based upon 100 grams of epoxy in the exothermus substance:

Table III

| No. | Curing Agent, gms. |
|---|---|
| 1 | 10 DETA. / 15 TETA. |
| 2 | 13.8 DETA. |
| 3 | 20.7 DETA. |
| 4 | 27.6 DETA. |
| 5 | 19.6 TETA. |
| 6 | 29.4 TETA. |
| 7 | 39.2 TETA. |
| 8 | 5.1 DETA. / 7.6 TETA. |
| 9 | 6.8 DETA. / 10.2 TETA. |
| 10 | 13.8 DETA. / 19.6 TETA. |
| 11 | 13.5 DETA. / 20.3 TETA. |

NOTE.—DETA is diethylenetriamine; TETA is triethylenetetramine

ILLUSTRATION "E"

Following the procedure of Illustration "A," an equivalent quantity of pre-expanded polyvinyltoluene beads of about the same bulk density are fabricated into an excellent quality foam structure, using as the exothermus substance a phenolic resin obtained from The General Electric Company under the trade designation "GE Phenolic Resin No. 12313." About the same exothermus substance-to-bead ratio of this phenolic resin is employed as in Illustration "A" using, in combination with the phenolic constituent as part of the exothermus substance, about 10 percent on the weight of the phenolic resin of an activating material for the resin which is also obtained from The General Electric Company under the trade designation "GE No. 12502 Acid Activator." The phenolic resin is of the type described in U.S. Patent 2,446,429. The acid activator is a water solution of phenolsulfonic acid. The pre-expanded polyvinyltoluene particles are obtained from expandable polyvinyltoluene beads having average particle size in the unexpanded form of about 1.4 mil, which beads are cross-linked with about 0.06 percent of divinylbenzene and contain dichlorodifluoromethane as a blowing agent. An excellent product having good uniform density, high strength and attractive appearance is thus prepared.

ILLUSTRATION "F"

The general procedure of Illustration "A" is repeated several times excepting to employ, in each case, as the exothermus substance either an epoxylated novolak resin (novolak) having an epoxide equivalent of about 175 or an epichlorohydrin-resorcinol condensation resin (resorcinol) having an epoxide equivalent of about 125, formulated according to the recipes in the following tabulation:

Table IV

| Recipe Number | Ingredient in Exothermus Substance | Parts by Weight of Exothermus Substance | Feed Temperature of Exothermus Substance |
|---|---|---|---|
| 1 | Novolak | 100 | 90° C. |
|   | DETA | 10 |  |
|   | TETA | 15 |  |
|   | Ethanol | 10 |  |
| 2 | Novolak | 100 | 90° C. |
|   | DETA | 10.9 |  |
|   | TETA | 16.3 |  |
|   | Ethanol | 10 |  |
| 3 | Resorcinol | 100 | Room Temperature and 90° C. |
|   | DETA | 15.2 |  |
|   | TETA | 22.8 |  |
|   | Ethanol | 10 |  |
| 4 | Resorcinol | 100 | 90° C. |
|   | DETA | 10 |  |
|   | TETA | 15 |  |
|   | Ethanol | 10 |  |

In each case, an excellent quality fabricated foam product is obtained.

ILLUSTRATION "G"

The procedure of Illustration "A" is again duplicated excepting, to employ as the exothermus substance, at about the same exothermus substance-to-bead ratio, a polyurethane resin. This exothermus substance consists of a prepolymer prepared by reacting about 4 moles of toluene diisocyanate with 1 mole of propylene chloride to produce a polyether which is further reacted with N,N,N′,N′-tetrakis (2-hydroxy propyl)ethylene diamine ("Quadrol") to provide the exothermus substance. The exothermus substance is fed to the charge of expandable granules at a temperature of about 65° C. Good quality fabricated product is obtained.

ILLUSTRATION "H"

Several samples of XLPS2 and PS foam-in-place (FIP) beads (pursuant to the description in the above Table II) were prepared using 6 to 8 percent pentane and about 10 percent monochlorotrifluoromethane ("Freon 11") as the blowing agent incorporated in the granules. The samples prepared were foamed using a mixture of magnesium chloride and water as the exothermus substance. The magnesium chloride salt employed was of a size that passed through 14 mesh and was retained by 24 mesh screening. Each of the self-expanding masses was prepared by charging the beads in dry magnesium chloride to a jar with a solid lid. The jar was then placed in a container of hot water at about 140° C. for 2 minutes and then removed from the heating bath. The solid top was then taken off the jar and replaced with a perforated lid. After this, the proper quantity of hot water to complete the exothermus substance was quickly added to the jar and the lid replaced. The recipes employed for the pentane-containing beads consisted of 10 parts beads plus 10 parts magnesium chloride plus 20 parts water. The recipe for the self-expanding "Freon 11"-containing beads was the same excepting that 30 parts water was employed. The results achieved are set forth in the following tabulation.

| Type Bead | Blowing Agent | Foam Density After Expansion | Foam Volume Ratio |
| --- | --- | --- | --- |
| PS | Pentane | 5.6 lbs./ft.$^3$ | 9 times. |
| PS | do | 5.9 lbs./ft.$^3$ | 11 times. |
| XLPS2 | "Freon 11" | Not actually measured | 6-7 times. |
| PS | do | do | Do. |

ILLUSTRATION "I"

About 92.5 parts of PS beads containing 6–8 percent of pentane blowing agent were mixed thoroughly with about 6 parts of an adhesive phenolic resin and 1.5 parts of magnesium oxide in order to provide expandable granules having a uniformly applied resin coating thereabout. Before the phenolic resin in the mixture became set up, about 100 parts of magnesium chloride was added so as to adhere upon and become bonded to the resin coating about the beads. About 200 parts of water was then added to the dry mix and permitted to foam. The resulting product had a foaming volume ratio of about 5–6 times with a foam density of about 14.9 lbs./ft.$^3$.

ILLUSTRATION "J"

About 2.2 pounds of PS FIP beads containing 6–8 percent of pentane as a blowing agent were dry mixed with about 2.2 pounds of magnesium chloride in a "fiberpak" carton having a height of 15 inches and a diameter of 8 inches. About 4.6 pounds of hot water was then added to the dry mixture. A vigorous foaming reaction ensued so as to fill the "fiberpak" with well-knit foam having a density of about 4.6 lbs./ft.$^3$.

ILLUSTRATION "K"

About 11.15 parts of PS FIP beads containing 6–8 percent pentane as a blowing agent were mixed with about 21.85 parts of high calcium lime (CaO); 15.60 parts of sodium ortho silicate and 51.40 parts of water. Foaming occurred within 5 minutes after mixing and preceded rapidly but not violently. The resulting integral foamed article was found to have experienced a foaming volume change of about 22 times.

ILLUSTRATION "L"

The procedure of Illustration "K" was essentially repeated excepting to eliminate the sodium ortho silicate and to use a formulation comprised of 24 parts of beads, 24 parts of lime and 52 parts of water. The resulting integral foam structure had a foaming volume change of about 11 times.

The articles which may be prepared by the method of the present invention, particularly sandwich construction articles, may be advantageously employed as insulation for low temperature applications such as in or around pipe and ducts or as insulating tile. They may also find wide application in the refrigeration field for doors, baffles, separators, food liners, freezer chests and for such uses as in food dispensing machines and the like. Sandwich constructions in accordance with the invention may be beneficially utilized for their buoyant characteristics by being utilized in boats, buoys, pontoons, docks, bulkhead fillers and the like. They may also be used for various laminated or surface skin sandwich constructions with metal, wood, glass and glass cloth, concrete, plastic materials and the like to form rigid, high strength, foam-reinforced articles. The present invention may also be practiced to fill the tips of airplane wings, for example, and other aircraft parts in order to secure greater strength in them and in the manufacture of such items as skis and various protective articles of clothing such as sun hats and safety headgear for both recreational and industrial purposes. Machine cases, luggage, furniture, mannikins, advertising display items and theatrical props such as breakaway items may advantageously be provided in accordance with the invention. In addition, the invention may be employed for various packaging purposes and to encapsulate and embed electrical components in an insulating matrix as well as in oil well casings and to provide various molds and forms for such installations as culverts and the like. Many other applications and uses for the present invention exist which are of equivalent significance and importance to the few which have been mentioned.

Certain changes and modifications in the practice of the present invention can be readily entered into without departing substantially from its intended spirit and scope. Therefore, it is to be fully understood that the invention is not to be considered as being limited or in any way restricted by the preferred embodiments thereof which are set forth in the foregoing description and specification. Rather, it is to be interpreted and construed in the light of what is set forth and detailed in the hereto appended claims.

What is claimed is:

1. Method for fabrication of a foam structure from particulate expandable granular thermoplastic resinous material containing in its individual particles a blowing agent for further expansion of its particles, which method comprises (1) charging a mass of said expandable thermoplastic resinous material in particulate form to an enclosing and confining mold form; (2) adding to a portion of said charged mass a quantity of a liquid self-reacting exothermus substance which is inert to the expandable thermoplastic resinous material, said exothermus substance being added in an amount which is adequate upon self-reaction to generate sufficient heat within the mass to soften it and raise its temperature to a foaming temperature and cause expansion of the particles therein without degrading and thermally decomposing said mass; and (3) permitting said exothermus substance, while said mass is contained and enclosed within said mold form, to spontaneously self-react within and permeate and diffuse through said mass by the progressive expanding and enlarging effect of said expandable thermoplastic resinous particles forcing said exothermus substance therethrough until said exothermus substance has completely progressed through said mass and self-reacted therein so as to knit and fuse together said expanded mass in the shape of said confining mold form.

2. The method of claim 1, wherein said expandable thermoplastic resinous material is a pre-foamed particulate material having a bulk density between about 30 and about 0.5 pound per cubic foot.

3. The method of claim 1, wherein said expandable thermoplastic resinous material is a thermoplastic alkenyl aromatic polymer.

4. The method of claim 1, wherein said expandable thermoplastic resinous material is a thermoplastic styrene polymer.

5. The method of claim 1, wherein said exothermus substance is added to said charged mass by feeding it to said mass after said mass has been charged to the mold.

6. The method of claim 1, wherein said exothermus substance is added to said charged mass by charging said mass of expandable thermoplastic material to a mold containing said exothermus substance.

7. The method of claim 1, wherein said exothermus substance contains a vaporizable, heat-absorbing coolant liquid in its composition.

8. The method of claim 1, wherein the self-reacting exothermus substance comprises an epoxide resin in combination with a curing agent for said resin.

9. The method of claim 1, wherein the self-reacting exothermus substance comprises an epoxide resin in combination with a curing agent for said resin and wherein it is employed in a quantity of between about 0.5 and 10 parts by weight of exothermus substance for each part by weight of expandable thermoplastic resinous material being fabricated.

10. The method of claim 1, wherein the self-reacting exothermus substance comprises an epoxide resin in combination with a curing agent for said resin and wherein it is employed in a quantity of between about 1 and 4 parts by weight of exothermus substance for each part by weight of expandable thermoplastic resinous material being fabricated.

11. The method of claim 8, wherein the epoxide resin is a bisphenol A-epichlorohydrin resin.

12. The method of claim 5, wherein said exothermus substance is added to said charged mass of expandable thermoplastic resinous material by feeding it to the surface of said mass in said mold.

13. The method of claim 5, wherein said exothermus substance is added to said charged mass of expandable thermoplastic resinous material by feeding it interiorly in a central portion of said mass in said mold.

14. The method of claim 1, wherein said mass of said expandable thermoplastic resinous material is charged to substantially fill the mold form.

References Cited in the file of this patent

Graham, D. L.: SPE Journal, A New Low Density Molding Material, October 1957, pp. 35–38.